US012289594B2

(12) United States Patent
McGrath

(10) Patent No.: US 12,289,594 B2
(45) Date of Patent: Apr. 29, 2025

(54) AUDIO FILTERBANK WITH DECORRELATING COMPONENTS

(71) Applicant: Dolby Laboratories Licensing Corporation, San Francisco, CA (US)

(72) Inventor: David S. McGrath, Rose Bay (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/683,762

(22) PCT Filed: Sep. 2, 2020

(86) PCT No.: PCT/US2020/049077
§ 371 (c)(1),
(2) Date: Mar. 1, 2022

(87) PCT Pub. No.: WO2021/046136
PCT Pub. Date: Mar. 11, 2021

(65) Prior Publication Data
US 2024/0114306 A1 Apr. 4, 2024

Related U.S. Application Data

(60) Provisional application No. 62/895,096, filed on Mar. 1, 2022.

(51) Int. Cl.
*H04S 3/02* (2006.01)
*H04S 5/00* (2006.01)

(52) U.S. Cl.
CPC ................ *H04S 3/02* (2013.01); *H04S 5/005* (2013.01)

(58) Field of Classification Search
CPC .................................. H04S 3/02; H04S 5/005
(Continued)

(56) References Cited

U.S. PATENT DOCUMENTS 4,896,356 A 1/1990 Millar
5,568,142 A 10/1996 Velazquez
(Continued)

FOREIGN PATENT DOCUMENTS

AU 2007308416 B2 7/2010
CN 100481722 C 4/2009
(Continued)

OTHER PUBLICATIONS

Huang, J. et al "Subband-Based Adaptive Decorrelation Filtering for Co-Channel Speech Separation" IEEE Transactions on Speech and Audio Processing, vol. 8, No. 4, Jul. 2000, pp. 402-406.
(Continued)

*Primary Examiner* — Xu Mei

(57) ABSTRACT

A multi-input, multi-output audio process is implemented as a linear system for use in an audio filterbank to convert a set of frequency-domain input audio signals into a set of frequency-domain output signals. A transfer function from one input to one output is defined as a frequency dependent gain function. In some implementations, the transfer function includes a direct component that is substantially defined as a frequency dependent gain, and one or more decorrelated components that have frequency-varying group phase response. The transfer function is formed from a set of sub-band functions, with each sub-band function being formed from a set of corresponding component transfer functions including direct component and one or more decorrelated components.

3 Claims, 4 Drawing Sheets

(58) Field of Classification Search
USPC .................................................. 381/1, 17–23
See application file for complete search history.

(56) References Cited

U.S. PATENT DOCUMENTS

| | | | | |
|---|---|---|---|---|
| 5,825,311 | A | 10/1998 | Kataoka | |
| 6,856,653 | B1 | 2/2005 | Taniguchi | |
| 7,738,593 | B2 | 6/2010 | Howard | |
| 8,081,764 | B2 * | 12/2011 | Takagi | G10L 19/008 381/23 |
| 8,121,311 | B2 * | 2/2012 | Hetherington | G10L 21/02 381/94.1 |
| 8,209,190 | B2 | 6/2012 | Ashley | |
| 8,219,408 | B2 | 7/2012 | Ashley | |
| 8,554,549 | B2 | 10/2013 | Oshikiri | |
| 8,831,931 | B2 | 9/2014 | Kuntz | |
| 8,867,753 | B2 | 10/2014 | Neusinger | |
| 8,879,747 | B2 | 11/2014 | Christoph | |
| 8,880,572 | B2 | 11/2014 | Ekstrand | |
| 8,908,893 | B2 | 12/2014 | Alfsmann | |
| 9,026,451 | B1 | 5/2015 | Kleijn | |
| 9,084,049 | B2 | 7/2015 | Fielder | |
| 9,191,766 | B2 | 11/2015 | Christoph | |
| 9,226,089 | B2 | 12/2015 | Mundt | |
| 9,269,360 | B2 | 2/2016 | McGrath | |
| 9,319,791 | B2 | 4/2016 | Kerner | |
| 9,449,608 | B2 | 9/2016 | Ekstrand | |
| 9,496,850 | B2 | 11/2016 | Jot | |
| 9,661,190 | B2 | 5/2017 | Zhang | |
| 9,997,171 | B2 * | 6/2018 | De Vries | H04S 7/00 |
| 2003/0108214 | A1 * | 6/2003 | Brennan | H03H 17/0266 381/94.1 |
| 2003/0142234 | A1 | 7/2003 | Dent | |
| 2004/0254797 | A1 | 12/2004 | Niamut | |
| 2007/0179781 | A1 | 8/2007 | Villemoes | |
| 2007/0276656 | A1 | 11/2007 | Solbach | |
| 2007/0288235 | A1 | 12/2007 | Riitta | |
| 2008/0175394 | A1 | 7/2008 | Goodwin | |
| 2011/0103620 | A1 | 5/2011 | Strauss | |
| 2012/0321105 | A1 | 12/2012 | McGrath | |
| 2013/0287225 | A1 | 10/2013 | Niwa | |
| 2013/0287226 | A1 | 10/2013 | Kerner | |
| 2013/0332154 | A1 | 12/2013 | Oshikiri | |
| 2014/0372107 | A1 | 12/2014 | Vilermo | |
| 2015/0049880 | A1 | 2/2015 | Lars | |
| 2016/0198281 | A1 | 7/2016 | Oh | |
| 2017/0310505 | A1 | 10/2017 | Nadal | |
| 2018/0053516 | A1 | 2/2018 | Kristofer | |
| 2018/0254053 | A1 | 9/2018 | Shi | |

FOREIGN PATENT DOCUMENTS

| | | | |
|---|---|---|---|
| CN | 101169934 | B | 5/2011 |
| CN | 101884065 | B | 7/2013 |
| CN | 102349235 | B | 3/2015 |
| CN | 103155591 | B | 9/2015 |
| CN | 105393553 | B | 7/2019 |
| CN | 109525218 | B | 12/2023 |
| EP | 2304975 | B1 | 8/2014 |
| EP | 3236626 | A1 | 4/2016 |
| EP | 2941020 | B1 | 6/2017 |
| EP | 3991294 | | 5/2022 |
| GB | 2547877 | B | 8/2019 |
| JP | 2001007769 | A | 1/2001 |
| JP | 2011517908 | T | 6/2011 |
| JP | 2013504908 | A | 2/2013 |
| JP | 2013102389 | A | 5/2013 |
| JP | 2013517687 | A | 5/2013 |
| JP | 2014049972 | A | 3/2014 |
| JP | 2018529121 | A | 10/2018 |
| KR | 1020090028755 | | 3/2009 |
| KR | 101806395 | B1 | 12/2017 |
| RU | 2411645 | C2 | 2/2011 |
| RU | 2484579 | C2 | 6/2013 |
| TW | 201234753 | A | 8/2012 |
| TW | 201419265 | A | 5/2014 |
| WO | 2003046891 | A1 | 6/2003 |
| WO | 2010086218 | A1 | 8/2010 |
| WO | 2015187711 | A1 | 12/2015 |

OTHER PUBLICATIONS

Pandey, Ashutosh "Perceptually Motivated Signal Processing for Digital Hearing Aids" May 2011, Subject Biomedical.

Lollmann et al: "Uniform and warped low delay filter-banks for speech enhancement", Speech Communication, Elsevier Science Publishers, Amsterdam, NL, vol. 49, No. 7-8, Jul. 26, 2007 (Jul. 26, 2007), pp. 574-587.

Mattera D et al: "Noncausal filters: Possible implementations and their complexity", Proceedings of International Conference On Acoustics, Speech and Signal Processing (ICASSP'03) Apr. 6-10, 2003 Hong Kong, China; [IEEE International Conference On Acoustics, Speech, and Signal Processing (ICASSP)], IEEE, 2003 IEEE International Con Fe, vol. 6, Apr. 6, 2003 (Apr. 6, 2003), pages VI 365-VI 368.

McGrath D S: an Efficient 30-BAND Graphic Equaliser Implementation for a Low Cost DSP PROCESSOR11 • Preprints of Papers Presented At the Aes Convention, xx. xx. vol. 95, Oct. 7, 1993 (Oct. 7, 1993), pp. 1-08,.

Yoo, H. et al."C4 Band-Pass Delay Filter for Continuous-Time Subband Adaptive Tapped-Delay Filter" May 23, 2004, 2004 IEEE International Symposium on Circuits and Systems (IEEE Cat. No.04CH37512), Vancouver, BC, 2004, pp. V-V.

* cited by examiner

AUDIO FILTERBANK WITH DECORRELATING COMPONENTS

CROSS-REFERENCE TO RELATED APPLICATIONS

This application claims priority to U.S. Provisional Patent Application No. 62/895,096, filed 3 Sep. 2019, which is incorporated herein by reference.

TECHNICAL FIELD

This disclosure relates generally to audio signal processing, and in particular, to audio signal processing where a set of one or more frequency-domain input audio signals is processed to create a new set of one or more frequency-domain output audio signals.

BACKGROUND

In audio signal processing it is common to convert a set of input audio signals to a a new set of audio output signals, where the number of output audio signals can be the same or more than the number of input audio signals. For example, a surround sound system can convert two input audio signals (e.g., stereo audio signals) into five output audio signals using a linear matrix operation. The linear matrix operation applies a matrix to the input audio signals that includes coefficients that can vary as a function of time or frequency. The linear matrix operation may also determine a covariance of the output audio signals when the input audio signals have been subjected to decorrelation processing.

SUMMARY

An multi-input, multi-output audio process is implemented as a linear system for use in an audio filterbank to convert a set of frequency-domain input audio signals into a set of frequency-domain output audio signals. A transfer function from one input to one output is defined as a frequency dependent gain function. In some implementations, the transfer function includes a direct component that is substantially defined as a frequency dependent gain, and one or more decorrelated components that have frequency-varying group phase response. The transfer function is formed from a set of sub-band functions, with each sub-band function being formed from a set of corresponding component transfer functions including direct component and one or more decorrelated components.

In some implementations, a method of converting a set of frequency-domain input audio signals to a set of frequency-domain output audio signals comprises: computing, using one or more processors, each frequency-domain output audio signal as a sum of filtered frequency-domain input audio signals, wherein each filter used to filter the frequency-domain input audio signals is characterized by a complex gain function over a respective sub-band frequency range of the frequency-domain input audio signal, wherein contributions of the frequency-domain input audio signals to the frequency-domain output audio signal is determined by a composite frequency-domain gain vector, and the composite frequency-domain gain vector is obtained by: computing, using the one or more processors, a set of component frequency-domain gain vectors, wherein at least one of the component frequency domain gain vectors is a decorrelating component frequency domain gain vector formed by augmenting the component frequency domain gain vector with additional component frequency-domain gain vectors with modified frequency responses to create a decorrelation effect; and summing, using the one or more processors, the component frequency-domain gain vectors to form the composite frequency-domain gain vector.

In some implementations, the decorrelating component frequency-domain gain vector is formed by scaling the at least one of the component frequency domain vectors by a component gain value.

In some implementations, one or more of the component frequency-domain gain vectors includes a phase response that varies over the sub-band frequency range, thereby providing a group-delay that is substantially constant over the sub-band frequency, and where the group-delay is substantially constant if a fluctuation in the group-delay is small enough to be perceptually insignificant for a listener.

In some implementations, one or more of the component frequency-domain gain vectors includes a phase response that varies over the sub-band frequency range, thereby providing a group-delay that varies over the sub-band frequency range to provide the decorrelation effect.

In some implementations, the decorrelating component frequency domain gain vector is formed by multiplying the component frequency domain gain vector by a decorrelation function.

In some implementations, an audio filterbank with decorrelating components comprises: a converter configured to convert a set of time-domain input audio signals into a set of frequency-domain input audio signals; and a linear mixer configured to convert the set of frequency-domain input audio signals into a set of frequency-domain output audio signals, wherein each frequency-domain output audio signal is a sum of filtered frequency-domain input audio signals, wherein each filter used to filter the frequency-domain input audio signals is characterized by a complex gain function over a respective sub-band frequency range of the frequency-domain input audio signal, and contributions of the frequency-domain input audio signals to the frequency-domain output audio signal is determined by a composite frequency-domain gain vector.

In some implementations, the composite frequency-domain gain vector is obtained by: computing a set of component frequency-domain gain vectors, wherein at least one of the component frequency domain gain vectors is a decorrelating component frequency domain gain vector formed by augmenting the component frequency domain gain vector with additional component frequency-domain gain vectors with modified frequency responses to create a decorrelation effect on the frequency-domain output audio signal; and summing the component frequency-domain gain vectors to form the composite frequency-domain gain vector.

In some implementations, the decorrelating component frequency-domain gain vector is formed by scaling the at least one of the component frequency domain vectors by a component gain value.

In some implementations, one or more of the component frequency-domain gain vectors includes a phase response that varies over the sub-band frequency range, thereby providing a group-delay that is approximately constant over the sub-band frequency, and where the group-delay is approximately constant if a fluctuation in the group-delay is small enough to be perceptually insignificant for a listener.

In some implementations, one or more of the component frequency-domain gain vectors includes a phase response that varies over the sub-band frequency range, thereby providing a group-delay that varies over the sub-band frequency range to provide the decorrelation effect on the frequency-domain output audio signal.

In some implementations, the decorrelating component frequency domain gain vector is formed by multiplying the component frequency domain gain vector by a decorrelation function.

In some implementations, a filterbank-based audio system comprises: a converter configured to convert a set of time-domain input audio signals into a set of frequency-domain input audio signals; and a linear mixer configured to convert the set of frequency-domain input signals into a set of frequency-domain output signals, the linear mixer including weighting coefficients that provide a frequency dependent gain function that includes a direct component that is defined as a frequency dependent gain and one or more decorrelated components that have a frequency-varying group phase response, the frequency dependent gain formed from a set of sub-band functions, with each sub-band function being formed from a set of corresponding component transfer functions including a direct component and one or more decorrelated components.

Other implementations disclosed herein are directed to a system, apparatus and computer-readable medium. The details of the disclosed implementations are set forth in the accompanying drawings and the description below. Other features, objects and advantages are apparent from the description, drawings and claims.

Particular embodiments disclosed herein provide one or more of the following advantages. The disclosed implementations integrate decorrelation processing into the audio filterbank, thus allowing input audio signals to be mapped to output audio signals using a single linear mixer, resulting in lower latency than conventional audio filterbanks that perform decorrelation processing using multiple linear mixers.

DESCRIPTION OF DRAWINGS

In the drawings, specific arrangements or orderings of schematic elements, such as those representing devices, units, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some implementations.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths, as may be needed, to affect the communication.

The same reference symbol used in various drawings indicates like elements.

DETAILED DESCRIPTION

In the following detailed description, numerous specific details are set forth to provide a thorough understanding of the various described embodiments. It will be apparent to one of ordinary skill in the art that the various described implementations may be practiced without these specific details. In other instances, well-known methods, procedures, components, and circuits, have not been described in detail so as not to unnecessarily obscure aspects of the embodiments. Several features are described hereafter that can each be used independently of one another or with any combination of other features.

Nomenclature

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." The terms "determined," "determines," or "determining" are to be read as obtaining, receiving, computing, calculating, estimating, predicting or deriving. In addition, in the following description and claims, unless defined otherwise, all technical and scientific terms used herein have the same meaning as commonly understood by one of ordinary skills in the art to which this disclosure belongs.

System Overview

Figure 1:
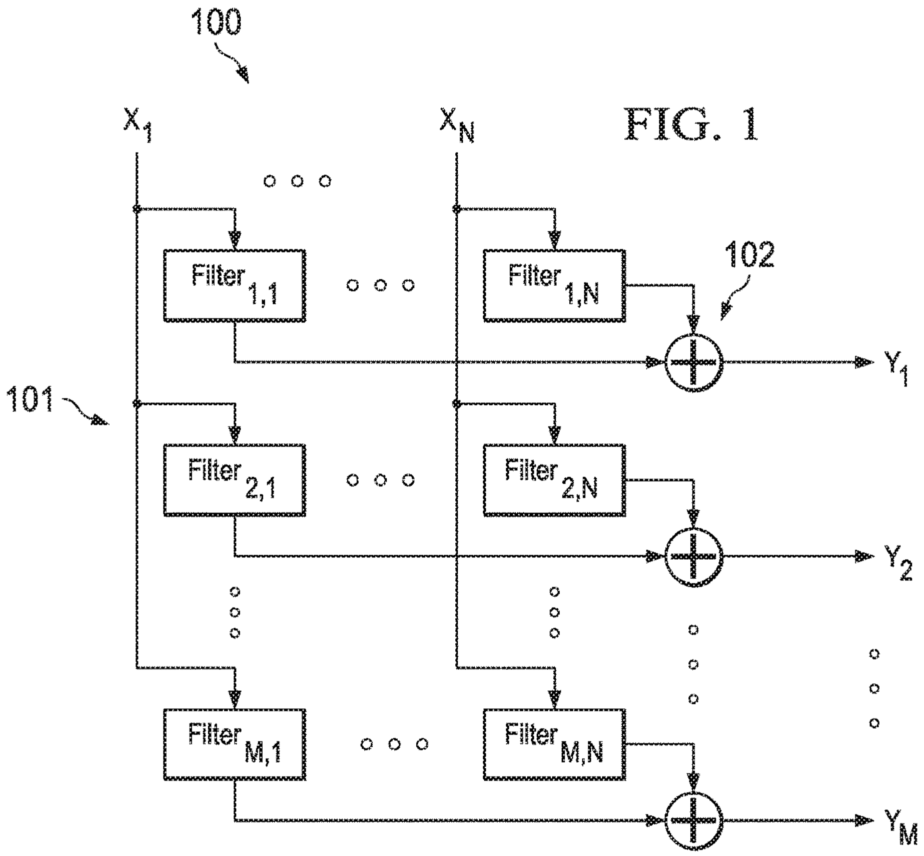
FIG. 1 illustrates a set of input audio signals filtered to produce a set of audio output signals using an array of filters, according to one or more embodiments.

FIG. 1 illustrates linear mixing system 100 where a set of input audio signals are filtered to produce a set of audio output signals, according to one or more embodiments. System 100 can be implemented in, for example, an audio filterbank. An audio filterbank includes an array of bandpass filters that separate an input audio signal into multiple frequency subbands of the input audio signal. In the example shown, linear mixing system 100 includes a bank of filters 101 and summers 102. N input signals ($X_1 \ldots X_N$) are processed by bank of filters 101 and summed together by summers 102 to produce M output signals ($Y_1 \ldots Y_M$). Linear mixing system 100 may be defined in terms of frequency-domain input and frequency-domain output signals as follows:

$$X(f) = \begin{pmatrix} X_1(f) \\ X_2(f) \\ \vdots \\ X_N(f) \end{pmatrix}, \quad [1]$$

$$Y(f) = \begin{pmatrix} Y_1(f) \\ Y_2(f) \\ \vdots \\ Y_N(f) \end{pmatrix} \quad [2]$$

$$= \begin{pmatrix} G_{1,1}(f) & G_{1,2}(f) & \ldots & G_{1,N}(f) \\ G_{2,1}(f) & G_{2,2}(f) & \ldots & G_{2,N}(f) \\ \vdots & \vdots & & \vdots \\ G_{M,1}(f) & G_{M,2}(f) & \cdots & G_{M,N}(f) \end{pmatrix} \times \begin{pmatrix} X_1(f) \\ X_2(f) \\ \vdots \\ X_N(f) \end{pmatrix}. \quad [3]$$

According to Equation [3], the frequency-domain output audio signals $Y_m(f)$ ($m \in [1 \ldots M]$) are formed as a sum of filtered frequency-domain input audio signals $X_n(f)$, wherein the contributions of the frequency-domain input audio signals $X_n(f)(n \in [1 \ldots N])$ to $Y_m(f)$ are determined by the composite frequency-domain vector, $G_{m,n}(f)$, according to:

$$Y_m(f) = \sum_{n=1}^{N} G_{m,n}(f) x X_n(f). \quad [4]$$

For the purpose of the following discussion, G(f) will be referred to as an example composite frequency-domain gain vector, and this term should be understood to refer to any one of the composite frequency-domain gain vectors $G_{m,n}(f)$ as used in Equations [3] and [4].

Figure 2:
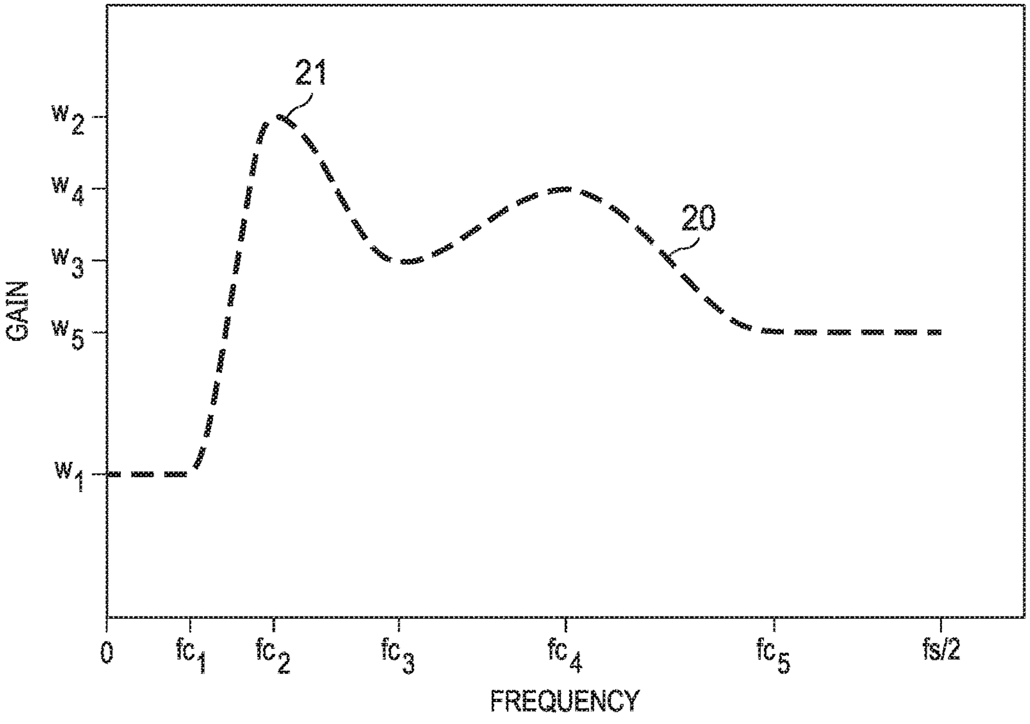
FIG. 2 illustrates a desired frequency response curve, according to one or more embodiments.

FIG. 2 illustrates a desired frequency response curve for a filter, according to one or more embodiments. A desired frequency response of an example composite frequency-domain gain vector can be generated by a process that creates smoothed functions, as shown in FIG. 2, wherein the filter gain 20, as a function of frequency, is defined according to a pre-defined set of control frequencies $fc_1$, $fc_2 \ldots$, and corresponding component gain values $w_1$, $w_2 \ldots$ For example, gain 21 of a filter at frequency $fc_2$ is set by component gain value $w_2$, as shown in FIG. 2. The frequency response shown in FIG. 2 is achieved by the weighted summation of a number of pre-defined component frequency-domain gain vectors.

Figure 3:
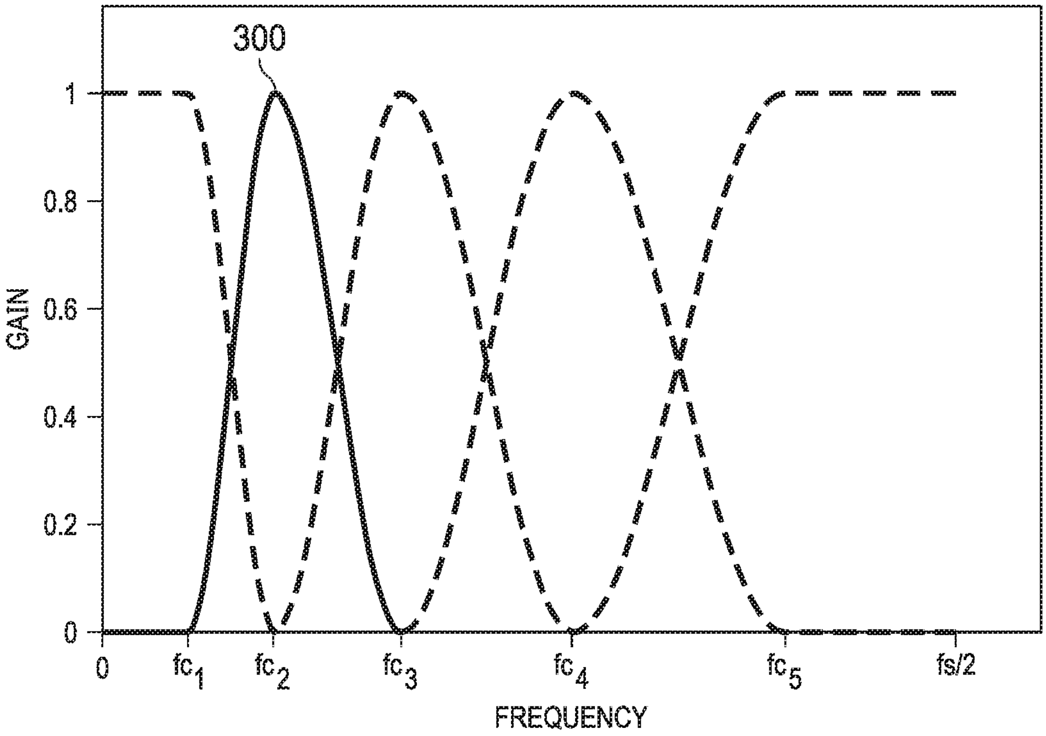
FIG. 3 illustrates a set of filter bank frequency responses, according to one or more embodiments.

FIG. 3 illustrates a set of filterbank frequency responses, according to one or more embodiments with the response 300 of frequency band 2, $H_{0,2}$ (f), being referenced. The frequency responses of these pre-defined component frequency-domain gain vectors are hereinafter referred to as component frequency-domain gain vectors, $H_{0,b}(f)$, for $b \in [1 \ldots B]$, where B is the number of bands (e.g., B=5 in the example of FIG. 3), and each of the component frequency-domain gain vectors has an alternative representation in the form of a time-domain impulse response, $h_{0,b}(n)$.

In a an embodiment, a desired filter response (see FIG. 2) may be formed from a weighted sum of pre-defined filter bank responses. This may be expressed as a time-domain or frequency-domain summation:

$$G(f) = \sum_{b=1}^{B} H_{0,b}(f) w_b. \quad [5]$$

In some implementations, the set of component frequency-domain gain vectors is augmented with additional component frequency-domain gain vectors $H_{0,b}(f)$ that have their frequency response modified to create a decorrelation effect. The expanded set of component frequency-domain gain vectors are referred to hereinafter as decorrelating component frequency-domain gain vectors, which are represented with the following nomenclature:

$$H_{l,b}(f) b \in [1 \ldots B], l \in [0 \ldots L]. \quad [6]$$

where B is the number of sub-bands and L is the number of decorrelation functions.

This augmented set of component frequency-domain gain vectors can be used in a filterbank-based audio processing system to generate a composite frequency-domain gain vector, by applying a modified form of Equation [5] as shown in Equation [7]:

$$G_{m,n}(f) = \sum_{l=0}^{L} \sum_{b=1}^{B} H_{0,b}(f) w_{l,b}. \quad [7]$$

Figure 4:
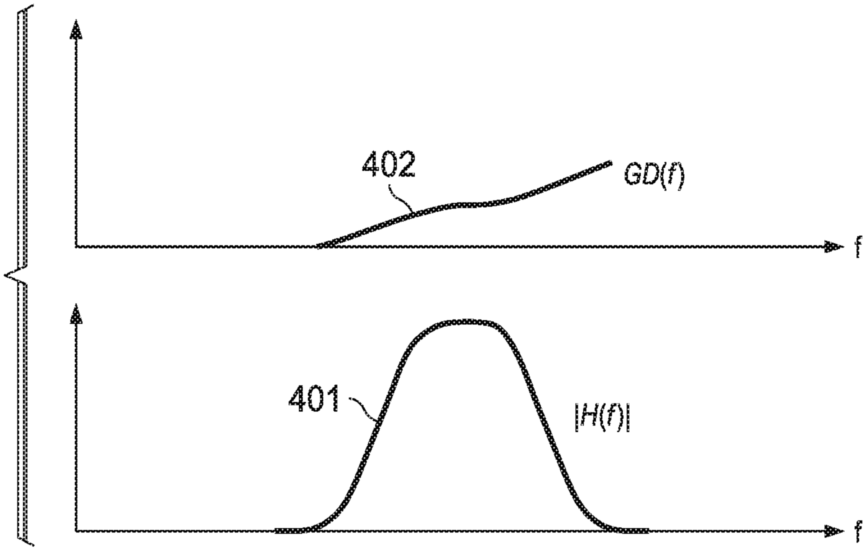
FIG. 4 illustrates a bandpass response of a typical component frequency-domain gain vector, according to one or more embodiments.

FIG. 4 illustrates a bandpass response of a typical component frequency-domain gain vector, according to one or more embodiments. In the example shown, the component frequency-domain gain vector, $H_{0,b}(f)$, has a magnitude response 401 that is generally dominant over a specific sub-band range of the total frequency range, and the group-delay 402 is substantially constant over the sub-band range. The group-delay is considered to be substantially constant if the fluctuation in group-delay is small enough to be perceptually insignificant for a listener when the filter is used to process an audio signal.

Figure 5:
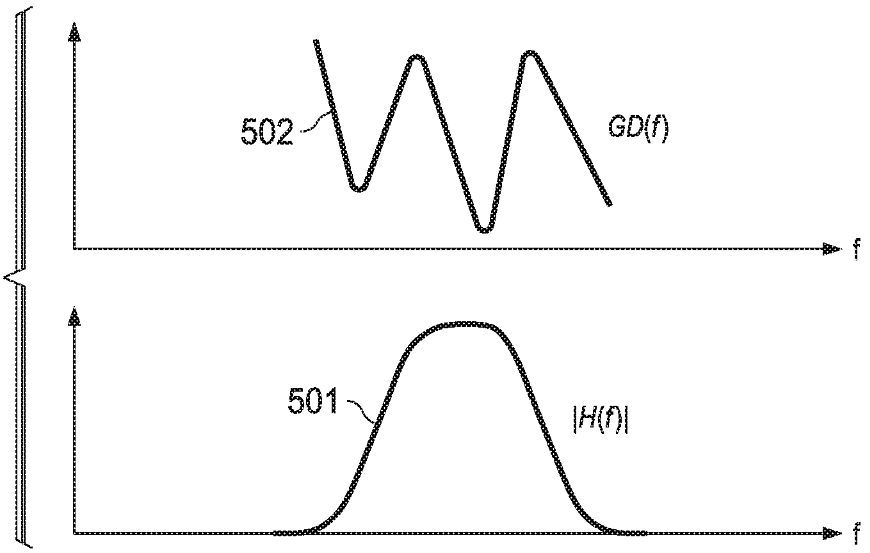
FIG. 5 illustrates the frequency response of a sub-band filter with group delay that varies significantly over frequency, according to one or more embodiments.

FIG. 5 illustrates the frequency response of a sub-band filter with group delay that varies significantly over frequency, according to one or more embodiments. The frequency response of a decorrelating component frequency-domain gain vector, such as $H_{l,b}$ (f) ($l \neq 0$), exhibits a group-delay 502 that varies over the sub-band frequency range, and wherein the variation in group-delay is such that input audio signals that are filtered by the decorrelating component frequency-domain gain vector, $H_{l,b}$ (f) ($l \neq 0$), is perceived to be decorrelated from input audio signals that are filtered by the component frequency-domain gain vector, $H_{0,b}(f)$.

It is known in the art how to create frequency responses with varying group-delay that vary over a wide frequency range for the purpose of creating a perceived decorrelation effect. In an embodiment, a known decorrelating frequency response may be adapted by applying a magnitude response 501 to form a decorrelating component frequency-domain gain vector. In an embodiment, a known decorrelating function $D_l(f)$ ($l \in [1 \ldots L]$) is used to compute a set of B decorrelating component frequency-domain gain vectors:

$$H_{l,b}(f) = D_l \times H_{0,b}(f)(b \in [1 \ldots B]). \quad [8]$$

Figure 6:
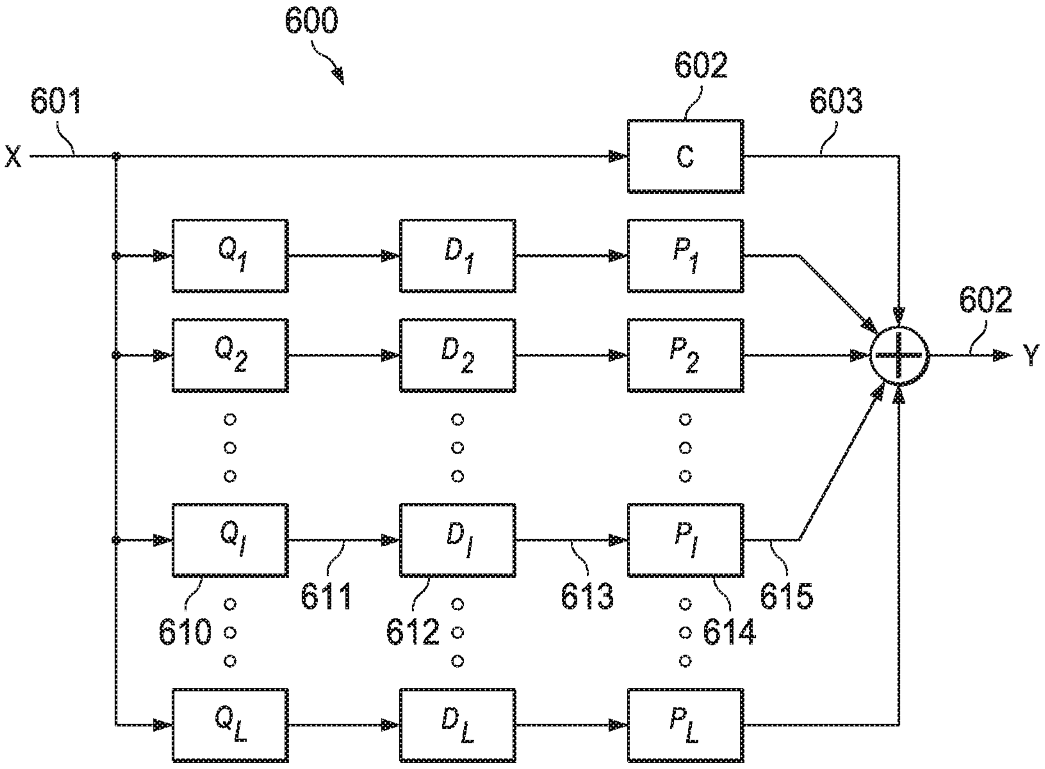
FIG. 6 illustrates a known method for mixing an input signal to create an output signal using a direct mixing matrix and one or more decorrelating mixing matrices, according to one or more embodiments.

FIG. 6 illustrates a system 600 for mixing an input signal to create an output signal using a direct mixing matrix and one or more decorrelating mixing matrices, according to one or more embodiments. Given a set of L known decorrelating functions, $D_l(f)$ ($l \in [1 \ldots L]$), an N-channel input signal (X)

is processed by system 600 to produce an M-channel output signal (Y). In this example, the processing for one sub-band (e.g., band b) is illustrated, wherein an N-channel input 601 (X) is applied to direct linear mixing matrix 602 (C) (e.g., an M×N matrix) to produce M-channel direct signal 603. N-channel input 601 is also processed by linear mixer 610 ($Q_l$) (e.g., an $K_L$×N matrix) to produce a set of $K_L$ channels 611 that are passed through a bank of $K_L$ decorrelation filters 612 ($D_l$), each of which applies a frequency response $D_L$ (f) to produce the $K_L$ channel signal 613, which is then remixed by linear mixer 614 ($P_l$) (e.g., an M×$K_L$ matrix) to produce M-channel decorrelation component signal 615. M-channel direct signal 603 is then summed with the M-channel decorrelation component signals (e.g., decorrelation component signal (615) to produce the M-channel output 602 (Y).

In this embodiment, an alternative to the processing shown in FIG. 6 is implemented by replacing the functions of linear mixing matrices C, $Q_1 \ldots Q_L$ and $P_1 \ldots P_L$ with a single set of weighting coefficients, $w_{l,b}^{m,n}$. According to an embodiment, and referring back to Equation [4], the output channel $Y_m$ (f) may be generated according to:

$$\begin{aligned} Y_m(f) &= \sum_{n=1}^{N} G_{m,n}(f) \times X_n(f), \\ &= \sum_{n=1}^{N} \left( \sum_{l=0}^{L} \sum_{b=1}^{B} H_{l,b}(f) w_{l,b}^{m,n} \right) \times X_n(f). \end{aligned} \quad [9]$$

Equation [9] can be implemented in a filterbank-based audio processing system, where the number of filters is (L+1)×B instead of the B filters that are known to be used in the art. This enlarged set of filters may be further considered to be B filters as previously known, with the addition of L×B filters that correspond to L different decorrelating functions.

In some implementations, Equation [9] is implemented as an audio filterbank that includes a converter (e.g., a Fast Fourier Transform) configured to convert a set of time-domain input audio signals into a set of frequency-domain input audio signals $X_n$(f), and a linear mixer (implement matrix multiplication operations) is configured to implement $$G_{m,n}(f) = \sum_{l=0}^{L} \sum_{b=1}^{B} H_{l,b}(f) w_{l,b}^{m,n}$$

to convert the set of frequency-domain input audio signals, $X_n$(f), into a set of frequency-domain output audio signals $Y_m$(f). Each frequency-domain output audio signal is a sum of filtered frequency-domain input audio signals, and each filter used to filter the frequency-domain input audio signals is characterized by a complex gain function over a respective sub-band frequency range of the frequency-domain input audio signal. Contributions of the frequency-domain input audio signals to the frequency-domain output audio signal are determined by a composite frequency-domain gain vector.

In some implementations, Equation [9] is implemented as an audio filterbank system that includes a converter (e.g., a Fast Fourier Transform) configured to convert a set of time-domain input audio signals into a set of frequency-domain input audio signals $X_n$(f), and a linear mixer (software or hardware for implementing sum of product operations) is configured to implement $$G_{m,n}(f) = \sum_{l=0}^{L} \sum_{b=1}^{B} H_{l,b}(f) w_{l,b}^{m,n}$$

to convert the set of frequency-domain input audio signals, $X_n$(f), into a set of frequency-domain output audio signals $Y_m$(f). The linear mixer includes weighting coefficients (the elements of $G_{m,n}$ (f)) that provide a frequency dependent gain function that includes a direct component that is defined as a frequency dependent gain and one or more decorrelated components that have a frequency-varying group phase response. The frequency dependent gain is formed from a set of sub-band functions, with each sub-band function being formed from a set of corresponding component transfer functions including a direct component and one or more decorrelated components.

Example Process

Figure 7:
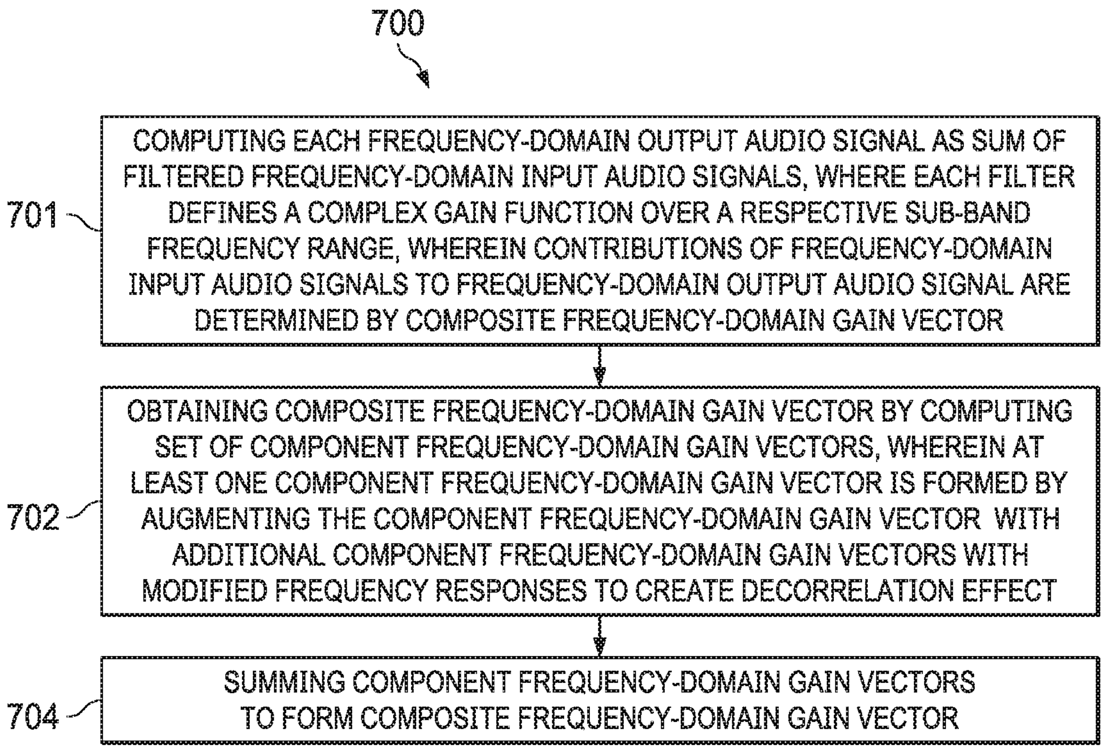
FIG. 7 is a flow diagram of an example process of converting a set of frequency-domain input audio signals into a set of frequency-domain output audio signals, according to one or more embodiments.

FIG. 7 is a flow diagram of an example process 700 of converting a set of frequency-domain input audio signals into a set of frequency-domain output audio signals, according to one or more embodiments. Process 700 can be implemented, for example, by system 800 described in reference to FIG. 8.

Process 700 computes each frequency-domain output audio signal as a sum of filtered frequency-domain input audio signals that each define a complex gain function over a respective sub-band frequency range, wherein the contributions of the frequency-domain input audio signals to the frequency-domain output audio signal are determined by a composite frequency-domain gain vector (701).

Process 700 continues by obtaining the composite frequency-domain gain vector is by computing a set of component frequency-domain gain vectors (702). At least one of the component frequency domain gain vectors is a decorrelating component frequency domain gain vector formed by augmenting the component frequency domain gain vector with additional component frequency-domain gain vectors having modified frequency responses to create a decorrelation effect.

Process 700 continues by summing the component frequency-domain gain vectors to form the composite frequency-domain gain vector (703).

Example System Architecture

Figure 8:
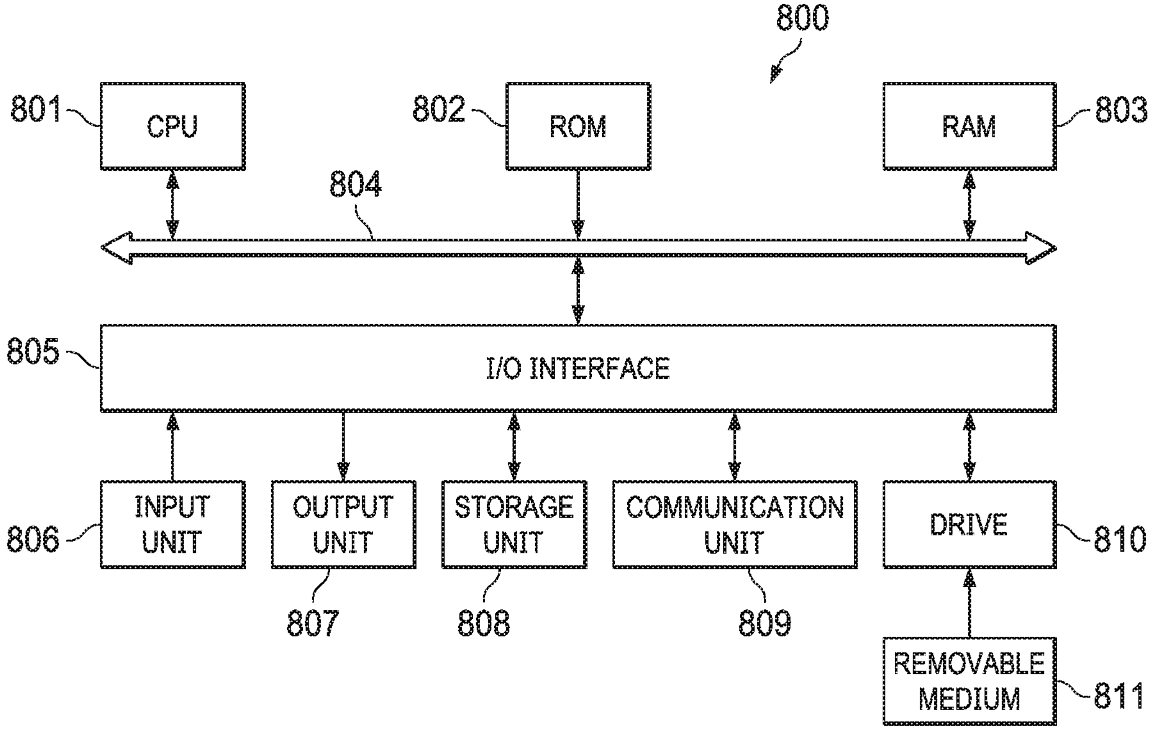
FIG. 8 shows a block diagram of a system suitable for implementing the features and processes described in reference to FIGS. 1-7, according to one or more embodiments.

FIG. 8 shows a block diagram of an example system 800 suitable for implementing example embodiments of the present disclosure. System 800 includes one or more server computers or any client device, including but not limited to: call servers, user equipment, conference room systems, home theatre systems, virtual reality (VR) gear and immersive content ingestion devices. System 800 includes any consumer devices, including but not limited to: smart phones, tablet computers, wearable computers, vehicle computers, game consoles, surround systems, kiosks, etc.

As shown, system 800 includes a central processing unit (CPU) 801 which is capable of performing various processes in accordance with a program stored in, for example, a read-only memory (ROM) 802 or a program loaded from, for example, a storage unit 808 to a random-access memory (RAM) 803. In the RAM 803, the data required when the CPU 801 performs the various processes is also stored, as required. The CPU 801, the ROM 802 and the RAM 803 are connected to one another via a bus 804. An input/output (I/O) interface 805 is also connected to the bus 804.

The following components are connected to the I/O interface 805: an input unit 806, that may include a keyboard, a mouse, or the like; an output unit 807 that may include a display such as a liquid crystal display (LCD) and one or more speakers; the storage unit 808 including a hard disk, or another suitable storage device; and a communication unit 809 including a network interface card such as a network card (e.g., wired or wireless).

In some implementations, the input unit 806 includes one or more microphones in different positions (depending on the host device) enabling capture of audio signals in various formats (e.g., mono, stereo, spatial, immersive, and other suitable formats).

In some implementations, the output unit 807 include systems with various number of speakers. The output unit 807 (depending on the capabilities of the host device) can render audio signals in various formats (e.g., mono, stereo, immersive, binaural, and other suitable formats).

The communication unit 809 is configured to communicate with other devices (e.g., via a network). A drive 810 is also connected to the I/O interface 805, as required. A removable medium 811, such as a magnetic disk, an optical disk, a magneto-optical disk, a flash drive or another suitable removable medium is mounted on the drive 810, so that a computer program read therefrom is installed into the storage unit 808, as required. A person skilled in the art would understand that although the system 800 is described as including the above-described components, in real applications, it is possible to add, remove, and/or replace some of these components and all these modifications or alteration all fall within the scope of the present disclosure.

In accordance with example embodiments of the present disclosure, the processes described above may be implemented as computer software programs or on a computer-readable storage medium. For example, embodiments of the present disclosure include a computer program product including a computer program tangibly embodied on a machine readable medium, the computer program including program code for performing methods. In such embodiments, the computer program may be downloaded and mounted from the network via the communication unit 809, and/or installed from the removable medium 811, as shown in FIG. 8.

Generally, various example embodiments of the present disclosure may be implemented in hardware or special purpose circuits (e.g., control circuitry), software, logic or any combination thereof. For example, the units discussed above can be executed by control circuitry (e.g., a CPU in combination with other components of FIG. 8), thus, the control circuitry may be performing the actions described in this disclosure. Some aspects may be implemented in hardware, while other aspects may be implemented in firmware or software which may be executed by a controller, microprocessor or other computing device (e.g., control circuitry). While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine/computer readable medium may be any tangible medium that may contain, or store a program for use by or in connection with an instruction execution system, apparatus, or device. The machine/computer readable medium may be a machine/computer readable signal medium or a machine/computer readable storage medium. A machine/computer readable medium may be non-transitory and may include but not limited to an electronic, magnetic, optical, electromagnetic, infrared, or semiconductor system, apparatus, or device, or any suitable combination of the foregoing. More specific examples of the machine/computer readable storage medium would include an electrical connection having one or more wires, a portable computer diskette, a hard disk, RAM, ROM, an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus that has control circuitry, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of converting a set of frequency-domain input audio signals to a set of frequency-domain output audio signals, the method comprising:

computing, using one or more processors, each frequency-domain output audio signal as a sum of filtered frequency-domain input audio signals, wherein each filter used to filter the frequency-domain input audio signals is characterized by a complex gain function over a respective sub-band frequency range of the frequency-domain input audio signal, wherein contributions of the frequency-domain input audio signals to the frequency-domain output audio signal are determined by a composite frequency-domain gain vector, and the composite frequency-domain gain vector is obtained by:

computing, using the one or more processors, a set of component frequency-domain gain vectors, wherein at least one of the component frequency domain gain vectors is a decorrelating component frequency domain gain vector formed by augmenting the component frequency domain gain vector with additional component frequency-domain gain vectors having modified frequency responses to create a decorrelation effect; and summing, using the one or more processors, the component frequency-domain gain vectors to form the composite frequency-domain gain vector.

2. A system comprising:

one or more processors; and a non-transitory computer-readable medium storing instructions that, upon execution by the one or more processors, cause the one or more processors to perform operations of claim 1.

3. A non-transitory, computer-readable medium storing instructions that, upon execution by one or more processors, cause the one or more processors to perform operations of claim 1.

* * * * *